(12) United States Patent  
Ivory et al.

(10) Patent No.: US 8,645,488 B2  
(45) Date of Patent: Feb. 4, 2014

(54) EXTENSIBLE FILE AND PATH RENAMING DURING MULTIMEDIA ACQUISITION

(75) Inventors: Andrew S. Ivory, Woodinville, WA (US); Ashley E. Averett, Sammamish, WA (US); Scott R. Ramsby, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1606 days.

(21) Appl. No.: 11/350,831

(22) Filed: Feb. 10, 2006

(65) Prior Publication Data

US 2007/0192446 A1    Aug. 16, 2007

(51) Int. Cl.
*G06F 15/16* (2006.01)

(52) U.S. Cl.
USPC ............ 709/217; 709/201; 382/305; 382/306

(58) Field of Classification Search
USPC ............... 707/7, 205, E17.143; 709/217–219
See application file for complete search history.

(56) References Cited

U.S. PATENT DOCUMENTS

| | | | | |
|---|---|---|---|---|
| 2002/0078069 | A1* | 6/2002 | Moore | 707/200 |
| 2004/0126038 | A1* | 7/2004 | Aublant et al. | 382/305 |
| 2004/0201740 | A1* | 10/2004 | Nakamura et al. | 348/231.3 |
| 2004/0230966 | A1* | 11/2004 | Morris et al. | 717/169 |

OTHER PUBLICATIONS

Box, Don, "Essential COM", 1998, Addison Wesley, pp. 135-136.*
Rogerson, Dale, "Inside COM", 1997, Microsoft Press, pp. 3-5, 9-10, 111-112.*

* cited by examiner

*Primary Examiner* — Patrice Winder
*Assistant Examiner* — Nam Tran
(74) *Attorney, Agent, or Firm* — Shook, Hardy & Bacon L.L.P.

(57) ABSTRACT

A method and system to extending naming of captured multimedia data to secondary applications is provided. The secondary applications are registered and associated with identifiers. The identifiers are stored in naming templates utilized by a file-naming engine. A multimedia-acquisition engine captures the multimedia data and communicates with the file-naming engine to generate a path that specifies a location to store the captured multimedia data. The file-naming engine processes the naming template to determine whether the secondary applications or default values are utilized to generate the path for the captured multimedia data.

19 Claims, 5 Drawing Sheets

EXTENSIBLE FILE AND PATH RENAMING DURING MULTIMEDIA ACQUISITION

CROSS-REFERENCE TO RELATED APPLICATION

Not Applicable

STATEMENT REGARDING FEDERALLY SPONSORED RESEARCH OR DEVELOPMENT

Not applicable.

BACKGROUND

Conventionally, files are stored in a computer at locations specified by a user. The user may utilize a command interface to specify the location of the file and a name for the file. When the user attempts to retrieve the file, the user enters the path and name in the command interface, and the computer retrieves the file.

Generally, metadata associated with computer files provide data that describes attributes associated with the file. The metadata associated with digital images provide rich information about venue or a device utilized to create the digital images. For instance, metadata associated with the digital images may include digital image size, resolution, device aperture, and date taken.

When a user generates large quantities of digital images having varying resolutions or aperture sizes, the user utilizing the conventional naming techniques may be burdened with manually organizing the large quantity of digital images. Conventionally, the user must specify the path or name for each digital. Some conventional techniques allow the user to specify a path for storing all digital images. However, after the digital images are stored at the location specified by the path, the user devotes considerable time to reorganizing and grouping the digital images.

SUMMARY

In an embodiment, a method to extend naming of captured multimedia data to secondary applications is provided. Templates associated with the captured multimedia data are retrieved and processed to extract identifiers. The identifiers are further processed to determine the format associated with the token. When the identifiers match a specified format, a collection of object identifiers is searched to determine if an object associated with each identifier is available. If an object is available, the object provides information that is utilized to generate paths for the captured multimedia data.

In another embodiment, a system to extend naming of captured multimedia to secondary applications is provided. The system includes a multimedia-acquisition engine, a file-naming engine and a registration server. The photo acquisition engine retrieves the captured multimedia data and communicates with the file-naming engine to generate a path that specifies the location for storing the captured multimedia data. The file-naming engine processes naming templates and communicates with the registration server to access secondary applications. Additionally, the file-naming engine creates paths to store the captured multimedia data based on default values associated with the naming templates, metadata associated with the captured multimedia data, or user-input received from a graphical user interface corresponding to a secondary application. Accordingly, the metadata associated with the captured multimedia data may be utilized to automatically organize the captured multimedia.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Multimedia data represents digital images, video and audio singularly or any combination of video, audio and digital images. Embodiments of the invention provide a method to extend naming of captured multimedia data to secondary applications. During multimedia acquisition a path is generated based on naming templates processed by a file-naming engine. The path may be generated based on information received from secondary applications, such as applications provided by third parties. The secondary application may extend the multimedia acquisition based on specialized interests associated with a user.

A system that extends naming of captured multimedia data to secondary applications may include one or more computers that have processors executing instructions associated with multimedia acquisition and file naming. The computers may include a registration server, a third-party, and a client. The client processor may generate a path to store captured multimedia data based on information received from the registration server and third-party. In an embodiment of the invention, the processors may be communicatively connected to the client computer through a communication network, and the client computer may include a portable device, such as, laptops, personal digital assistants, smart phones, etc.

Figure 1:
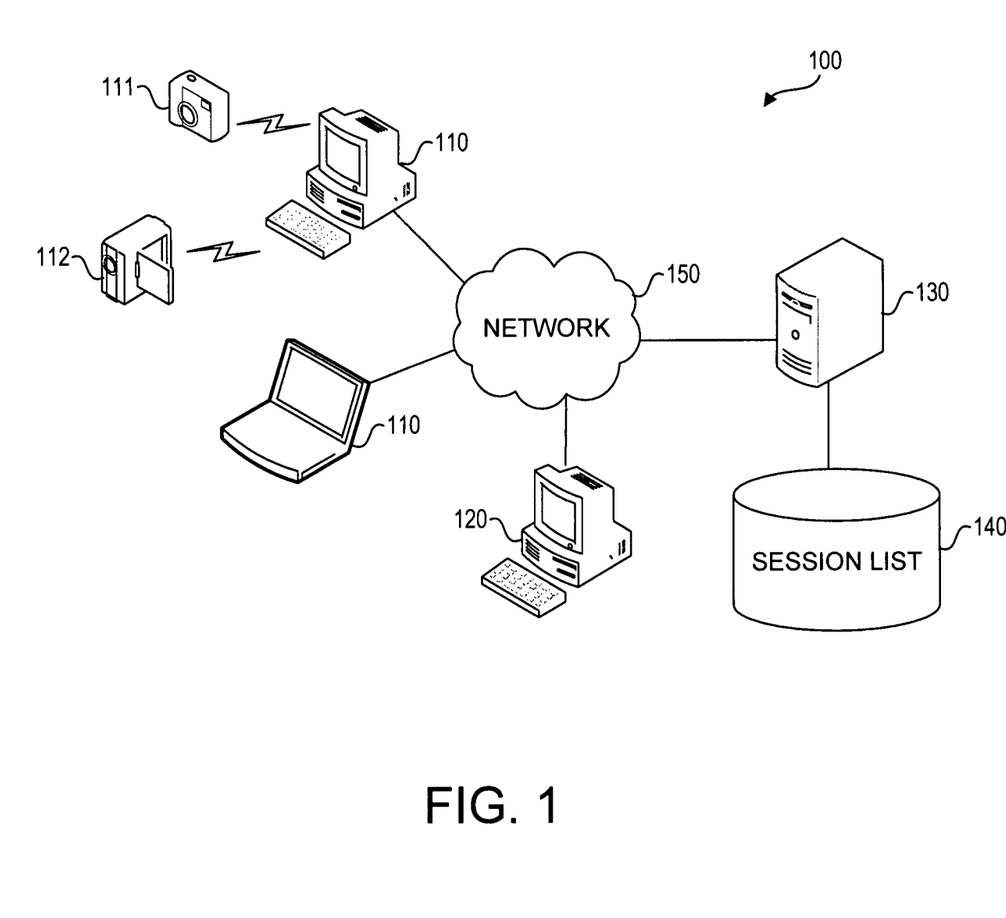
FIG. 1 is network diagram that illustrates an exemplary computing environment, according to embodiments of the invention.

FIG. 1 is network diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes client devices 110, multimedia capture devices 111 and 112, a third-party device 120, server 130, a database 140 and a communication network 150.

The client devices 110 each have processing units coupled to a variety of input devices and computer-readable media via communication buses. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by client devices 110 and communication media may include wired and wireless media. The input devices may include, mice, keyboards, joysticks, controllers, microphones, multimedia capture devices, such as, cameras 111 and camcorders 112, or any suitable device for providing user input to the client devices 110.

The third-party device 120 allows a developer to create objects or applications that provide specialized naming paths based on metadata or attributes associated with captured multimedia data or based on details received via a graphical user interface (GUI). Additionally, a source that provides naming information utilized to generate paths may be selected from a collection of sources. The sources may include a local database, external website, GUI, or a random number generator. In an embodiment of the invention, the objects or applications are in Component Object Model (COM) format. The third-party device 120 sends the COM object or applications over the communication network 150 to facilitate the naming of captured multimedia data. In an alternate embodiment, the third-party device 120 and client device 110 are the same device, and the application or COM object communicate over a device bus and between object interfaces.

When the client device 110 retrieves captured multimedia data from multimedia capture devices 111 and 112, the client initiates communications with the server 130 and third-party device 120. In an embodiment of the invention, the client devices 110 communicates with a server 130, which registers objects or application that provide information utilized when naming captured multimedia data. The server 130 is connected to database 140 that stores a session list having identifiers corresponding to the objects or applications currently being utilized to complete the multimedia acquisition.

Additionally, the client devices 110 may store application programs that provide computer-readable instructions to implement various heuristics. The client device 110 executes the computer-readable instructions to receive the captured multimedia data and to process information received from the server 130 and third-party device 120 for generating paths for the captured multimedia data. In certain embodiments, the client devices 110 may be portable devices that utilize a mobile-browser application that enables mobile devices to wirelessly communicate through wireless access points. Accordingly, the client devices 110 may wirelessly connect to the server 130, where requests generated by the mobile-browser application are processed to generate paths that specify locations for storing the captured multimedia data.

The communication network 150 may be a local area network, a wide area network, satellite network, wireless network or the Internet. The client devices 110 may include laptops, smart phones, personal digital assistants, or desktop computers. The client devices 110 utilize the communication network 150 to communicate with the server 130 and third-party device 120. The server 130 receives communications from the client devices 110 and processes the communications to provide information that may be utilized to generate a path. The computing environment 100 illustrated in FIG. 1 is exemplary and other configurations are within the scope of the invention.

A computer-implemented method is a method implemented at least in part by a machine or a method implemented at least in part by a computing device. The machine or computing device includes, but are not limited to, a laptop, desktop, personal digital assistant, or multi-processing systems, or any device capable of storing or executing instructions associated with the methods described in the following description.

In an embodiment, captured multimedia data is processed by file-naming and photo-acquisition engines to generate paths based on tokens included in naming templates. The photo-acquisition engine communicates with an external multimedia database storing captured multimedia data to retrieve captured multimedia data and to generate a path to store the captured multimedia, where the path is defined based on metadata or attributes associated with the captured multimedia. The photo-acquisition engine communicates with the file-naming engine to generate the path. The file-naming engine selects a naming template associated with the captured multimedia data. The naming template includes one or more tokens that specify an identifier corresponding to an application or object that provides the information that may be utilized to create the path. Additionally, the file-naming engine utilizes the one or more tokens to communicate with a registration server to obtain path information from the application or object. In certain embodiments, the application or object are the third-party applications that process the captured multimedia data to extract metadata and format the metadata to represent path information. In alternate embodiments, the third-party application may utilize a graphical user interface to retrieve user-defined path information.

Figure 2:
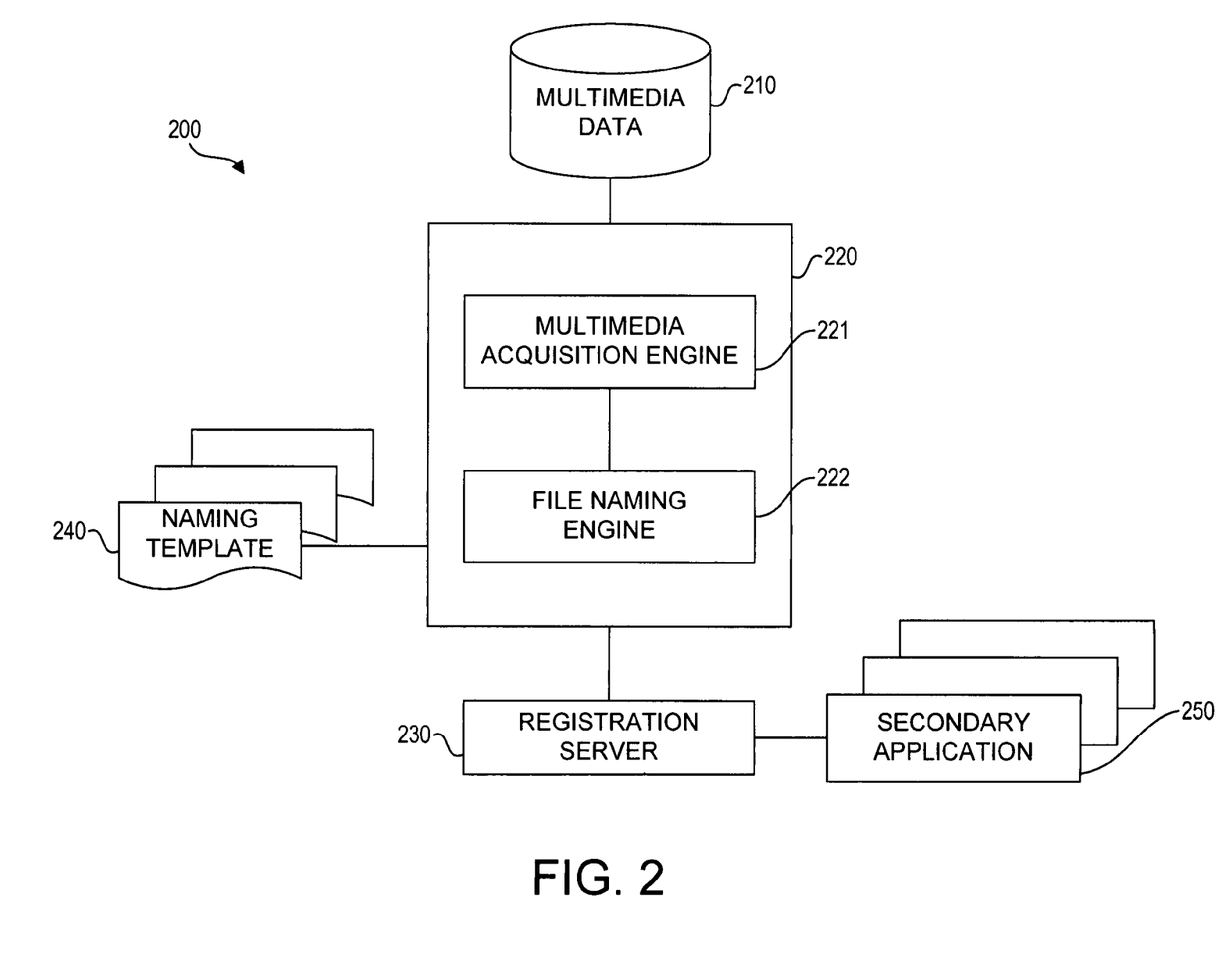
FIG. 2 is a block diagram that illustrates a renaming system, according to embodiment of the invention.

FIG. 2 is a block diagram that illustrates a renaming system 200, according to embodiments of the invention. The renaming system 200 includes a multimedia database 210, an extending engine 220, a registration server 230, naming templates 240 and secondary applications 250.

The multimedia database 210 may be an external database located on a multimedia capture device or associated with a server on a communication network. The multimedia database 210 stores the multimedia data captured by the multimedia capture device. In certain embodiments, the captured multimedia data may be associated with metadata that describes the multimedia data. For instance, the captured multimedia data may include digital images stored in the Joint Photographic Expert Group (JPEG) format and the metadata associated with the digital image may be stored in an Exchangeable Image File Format (EXIF) associated with and embedded in the JPEG format of the digital image. The EXIF may store metadata about the venue, flash and lens used by the multimedia capture device, such as, a Nikon® digital camera. The EXIF may store aperture information such as, for example "28-70 F/2.8 D." Accordingly, the multimedia database 210 may provide access to the captured multimedia data and associated metadata.

The extending engine 220 accesses the captured multimedia stored in the multimedia database 220 and generates a path that specifies a location to the store the captured multimedia data. The extending engine 220 includes a photo-acquisition engine 221 and a file-naming engine 222. The photo-acquisition engine 221 retrieves the captured multimedia data and associated metadata from the multimedia database 210 and communicates with the file-naming engine 222 to generate a path and name for the captured multimedia data. The file-naming engine 222 processes the captured multimedia data and associated metadata to select an appropriate naming template 240. In certain embodiments of the invention, the photo-acquisition engine and file-naming engine 222 may be executed on different devices.

The naming template 240 includes tokens and placeholders that provide the file-naming engine 222 with information associated with the captured multimedia data. In an embodiment, the naming template is formatted to provide the file-naming engine 222 references to secondary applications 250 that may provide naming information for the captured multimedia data. In an alternate embodiment, the naming template 240 also includes default values that provide path information when the reference to the secondary application 250 is not present.

The file-naming engine 222 processes the selected naming template 240 and accesses a registration server 230 to determine whether an object or an application is associated with the reference was recently used. In certain embodiments, the object or application may be a secondary application 250 that provides specialized naming instructions developed by a third party. The registration server 230 stores a list of references corresponding to secondary applications 250 that were recently instantiated and utilized by the file-naming engine 222. If the registration server 230 does not store the reference, the file-naming engine 222 instantiates the secondary application 250 and registers a reference corresponding to the secondary application 250 at the registration server 230.

As indicated above, in some embodiments, the secondary applications 250 are objects or applications developed by a third party. The secondary applications 250 provide naming information that may be utilized by the file-naming engine to generate paths. In certain embodiments, the secondary applications 250 are Component Object Models (COM) objects that process the captured multimedia to extract the metadata that is be formatted to represent naming information. When creating the secondary applications 250, a developer associates a class identifier (CLSID) with the COM application or object that implements interfaces associated with generating a path. In an embodiment, the COM object would implement IPhotoAcquireFilenameToken interface to retrieve naming information. The IPhotoAcquireFilenameToken interface may generate the naming information based on metadata associated with the captured multimedia data or based on information obtained from parsing the captured multimedia data.

In an embodiment, the naming templates provide tokens that are processed to determine a name and path to associate with captured multimedia data. The file-naming engine utilizes the tokens to create names and directories for the captured multimedia data. The naming template may be structured to include a prefix, token, subtoken, suffix, and alternate. The prefix specifies naming information that is pre-pended to the token, while the suffix specifies naming information that is appended to the token. The token represents a place or reference for the naming information, and the subtoken represents additional information that may be communicated to the file-naming engine or secondary application. The alternate provides default naming information that is utilized to generate the name and path for the captured multimedia data when the token and subtoken are not present. In certain embodiments, the token and subtoken are associated with secondary applications that provide naming information. In another embodiment, the file-naming engine processes the naming information and applies the prefix and suffix to generate the name and paths for the captured multimedia data. Accordingly, the file-naming engine processes the naming template to produce names and paths for the captured multimedia data. In an alternate embodiment, the naming template is a token having a prefix, a first part, second part, suffix and alternate, where the first part and second part are identifiers for an object or application that provides naming information.

Figure 3:
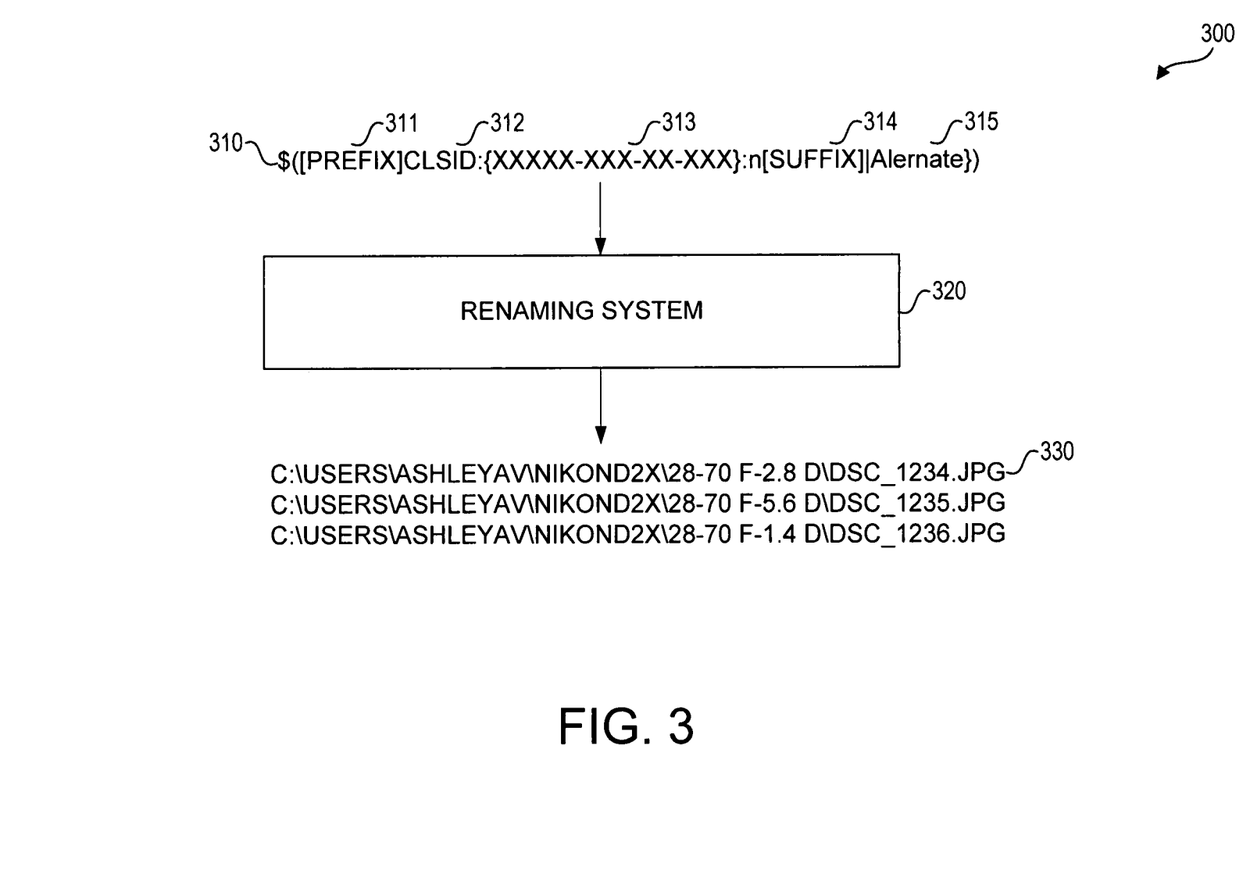
FIG. 3 is a format diagram that illustrates a naming template structure utilized by the renaming system to generate paths, according to embodiments of the invention.

FIG. 3 is a format diagram that illustrates a naming template structure 310 utilized by the renaming system 320 to generate paths 330, according to embodiments of the invention. The renaming system 320 selects the naming template 310 based on the captured multimedia data received from the multimedia database. The naming template 310 includes a prefix 311, a token 312, subtoken 313, suffix 314 and alternate 315. In an embodiment, the token 312 and subtoken 313 may be concatenated to represent a single string that is processed by the file-naming engine to instantiate a corresponding object or application. The prefix 311 and suffix 314 are strings that may be attached to naming information associated with the token 312 and subtoken 313 based on a collection of naming rules associated with the file-naming engine. The alternate 315 provides default-naming information that may be utilized by a default application associated with the file-naming engine. In an embodiment, the alternate 315 triggers the default application to execute a routine that provides the file-naming engine with default values associated with the alternate 315 to generate paths, when the token 312 and subtoken 313 refer to an application or object that cannot be instantiated.

In certain embodiments, the token 312 and subtoken 313 are related to secondary applications that process the captured multimedia data or metadata associated with the captured multimedia to generate naming information. The tokens 312 and subtoken 312 may specify a reference to a secondary application. The reference may include the CLSID as the token 312 and indicate an identifier as the subtoken 313. In an embodiment of the invention the identifier comprises a hexadecimal portion concatenated with an integer portion. When the file-naming engine processes a naming template have the CLSID token 312 and identifier subtoken 313, the file-naming engine initiates a communication session with the registration server to access the secondary application. In an embodiment, the paths generated by the file-naming engine may have a format such as the format illustrated in Table 1 below.

TABLE 1

| (PicturesFolder)\(AcquireDate)\(CameraModel)\(LensUsed)\(OriginalFilename).(OriginalExtension) |
| --- |

Here, the secondary application may excite instructions to extract the acquire date, camera mode, and lens metadata associated with the captured multimedia data. In turn, the secondary application converts the metadata to strings for use as path elements. The file-naming engine utilizes the path elements to create the path and name for the captured multimedia data.

In some embodiments, the secondary applications process new types of metadata when generating names and paths based on the specialized needs of the client. Accordingly, the renaming system 320 may be updated by utilizing new secondary applications that understand how to extract new forms of metadata.

The naming of captured multimedia data is extended to secondary applications through naming templates having specialized tokens. The file-naming engine processes the naming templates and communicates with the secondary applications to generate the name and path for captured multimedia data.

Figure 4:
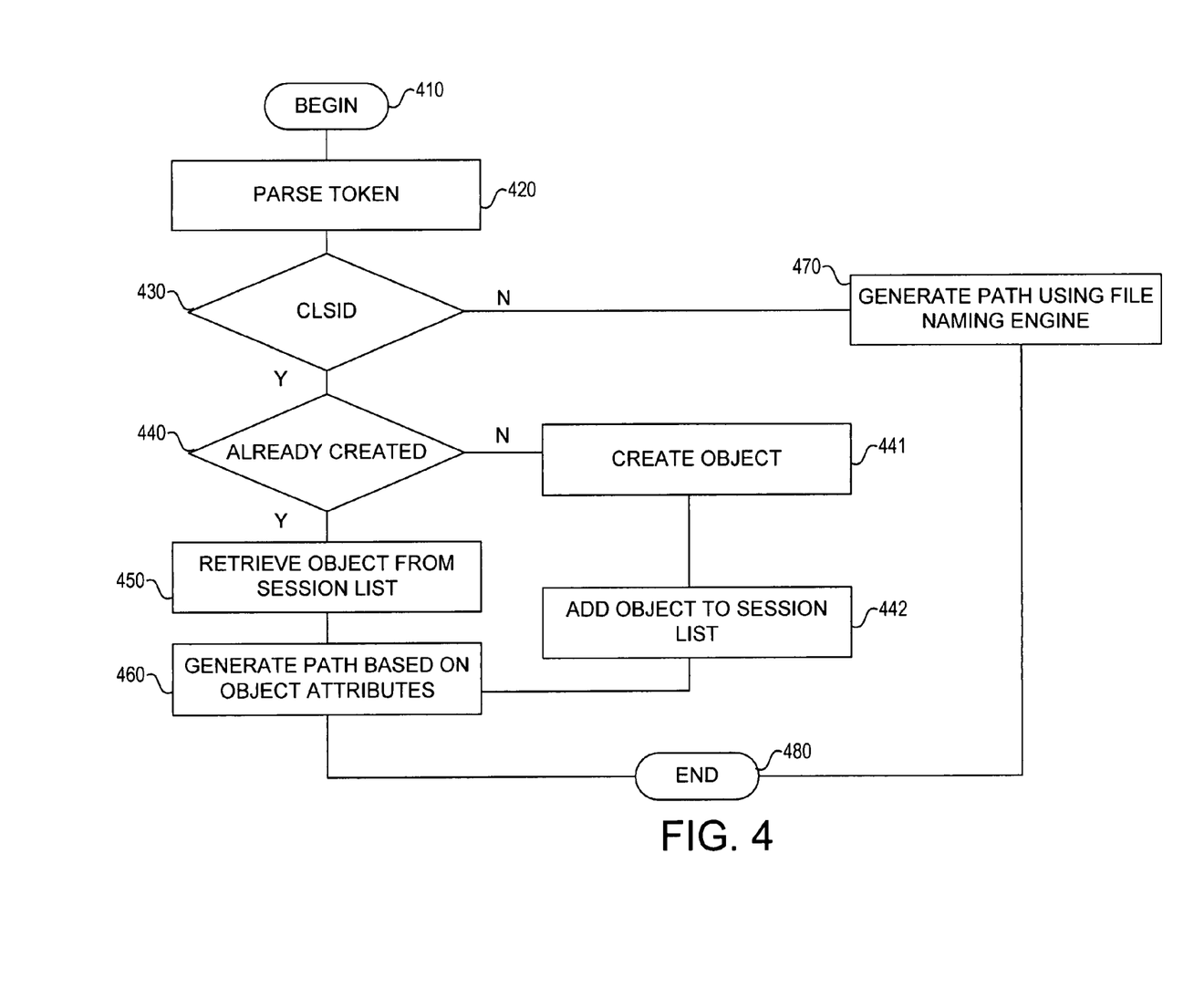
FIG. 4 is a flow diagram that illustrates a method to name captured multimedia data, according to embodiments of the invention.

FIG. 4 is a flow diagram that illustrates a method to name captured multimedia data, according to embodiments of the invention. The method begins in step 410 after the token has been extracted from the naming template. The token extracted from the naming template is parsed in step 420. In step 430, the token is checked to determine whether the token is associated with a CLSID token. When the token is not a CLSID token, the path generated utilizes default values in step 470.

When the token is a CLSID token, a subsequent check is made to determine whether the object or application associated with the subtoken is already instantiated in step 440. When the object is not instantiated, the object is created in step 441 and a session list storing all previously created objects is updated to include the object in step 442. In turn, the path is generated based on naming information received from the object in step 460.

On the other hand, when the object is already instantiated the object is retrieved from the session list in step 450. In turn, the path is generated based on naming information received from the object in step 460. The method ends in step 480.

The tokens associated with the naming template provide identifiers that define whether a secondary application generates path information or whether a default application utilizing default values generates the path information.

Figure 5:
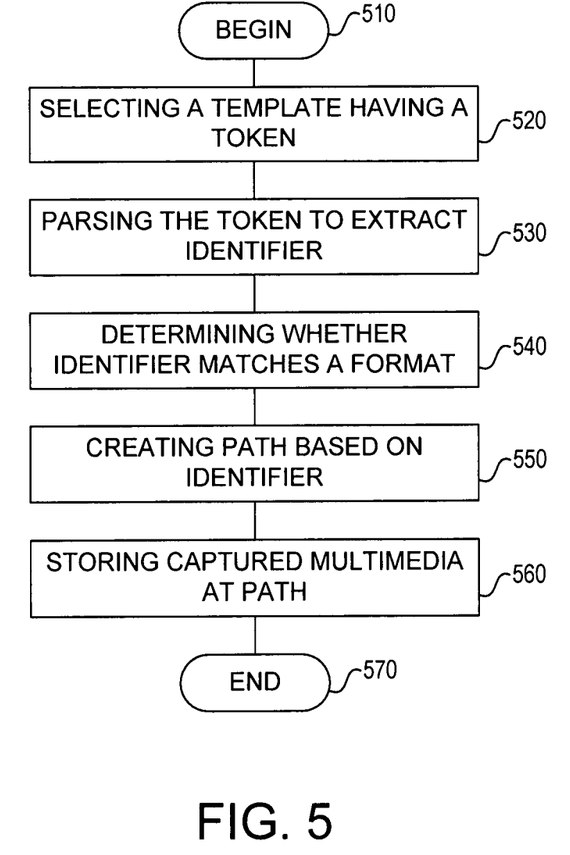
FIG. 5 is a flow diagram that illustrates a method to extend naming of captured multimedia data to secondary applications.

FIG. 5 is a flow diagram that illustrates a method to extend naming of captured multimedia data to secondary applications. The method begins after the captured multimedia data is retrieved from the multimedia database in step 510. In step 520, a naming template is selected having a token. The token is parsed to extract an identifier in step 530. In step 540, a determination is made to decide whether the identifier matches a specified format. When the identified matches the specified format a secondary application is utilized to provide naming information. Otherwise, a default application provides default values for the naming information. In step 550, the path is created based on the identifier and associated naming information. The captured multimedia data is stored at the location specified by the path in step 560. The method ends in step 570. Accordingly, when the identifier matches the specified format, the secondary application is utilized to generate the path. Otherwise, a default application is utilized to generate the path.

In summary, the naming of captured multimedia data is extended to secondary applications based on the naming templates associated with the captured multimedia data. The secondary applications provide naming information that is utilized to generate the path for the captured multimedia data. The secondary applications automatically organize the captured multimedia in the paths generated for the naming templates.

Alternate embodiments of the invention, may include a data structure having a format that includes a token portion and alternate portion. The token portion includes an identifier having a hexadecimal portion and integer portion. The token references a secondary application that processes captured multimedia data or metadata associated with the captured multimedia data to generate naming information. The secondary application may also extract new metadata from the captured multimedia and utilize the new metadata to generate path information. The new metadata represents metadata that was not originally associated with the captured metadata.

Moreover, an alternate embodiment for extending the naming of captured multimedia data to secondary applications may generate a path based on default values. The naming template having a token is selected based on the captured multimedia. The token associated with the naming template is parsed to extract an object identifier. Default values are utilized to generate a path when the object identifier does not match a specified format. A path is created from the default values associated with the object identifier, and the captured multimedia is stored at a location specified by the path.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to extend naming of captured multimedia data to a secondary application, the method comprising:

selecting a naming template having a token, subtoken, and alternate, wherein the token identifies the secondary application that provides naming information for the captured multimedia data, and the alternate provides default naming information when the token and subtoken are not present;

parsing the token to extract an object identifier that corresponds to the secondary application;

verifying that the format of the object identifier matches a specified format utilizing specialized naming instructions;

creating a path to store the captured multimedia data based on the object identifier, the path includes metadata extracted from the captured multimedia data by the secondary application;

receiving the captured multimedia data from a registration server;

processing the captured multimedia data by a file-naming engine;

generating a path name for the captured multimedia data via the file-naming engine;

storing the captured multimedia data at a location specified by the path;

instantiating the secondary application; and registering a reference associated with the secondary application at the registration server.

2. The method according to claim 1, wherein the template is selected based on the captured multimedia data comprising data for one or more of a device acquire date, a device mode, or lens.

3. The method according to claim 1, wherein creating the path further comprises:

instantiating an object associated with the object identifier.

4. The method according to claim 3, further comprising:

extracting values associated with attributes of the object.

5. The method according to claim 4, wherein the object generates a graphical user interface to define the path.

6. The method according to claim 5, wherein the object is another secondary application.

7. The method according to claim 1, wherein the secondary application is a COM application.

8. A computer-implemented method to name captured multimedia data, the method comprising:

capturing multimedia data by a multimedia capture device of a multimedia database;

associating metadata with the captured multimedia data;

storing the captured multimedia data and the associated metadata in the multimedia database;

instantiating a secondary application comprising naming information for the captured multimedia data;

registering the instantiated secondary application;

storing a reference corresponding to the registered secondary application with a list of references in a registration server;

retrieving the captured multimedia data and the associated metadata from the multimedia database via a photo-acquisition engine;

creating a path to store the captured multimedia data via a file-naming engine in communication with the photo-acquisition engine;

selecting a naming template comprising a token, subtoken, and alternate, wherein the alternate triggers a default application to execute when the secondary application cannot be instantiated;

processing the naming template to generate a name associated with the path via the file-naming engine;

storing the captured multimedia data at a location specified by the path; and accessing the registration server to determine whether a reference associated with another secondary application is stored with the list of references.

9. The method according to claim 8, further comprising: verifying that an identifier of the token is associated with the registered secondary application:

by searching a session list for a matching identifier.

10. The method according to claim 9, wherein the secondary application is instantiated, when the identifier matches a specified format and the identifier is not included in the session list.

11. The method according to claim 10, further comprising: storing the identifier in the session list.

12. The method according to claim 8, wherein the file-naming engine utilizes the token to create directories for the captured multimedia data.

13. A computer-implemented system having processor, memory, and data storage subsystems to extend naming of captured multimedia data to a secondary application, the system comprising:

a multimedia-acquisition engine to select a naming template having a token corresponding to the captured multimedia data;

a file-naming engine which executes the following:
 creating a name and a path to store the captured multimedia data via the processor,
 extracting new metadata via the secondary application to generate information on the path, and
 creating a reference to the secondary application in the naming template; and a registration server to store a list of references to one or more associated secondary applications, the registration server being accessed by the file-naming engine to provide access to the secondary applications associated with the token, wherein at least one of the secondary applications comprises specialized naming instructions developed by a third party to name a captured multimedia file.

14. The computer-implemented system according to claim 13, wherein the naming template includes a prefix, suffix and an alternate utilized by the search engine to generate the name of the captured multimedia file.

15. The computer-implemented system according to claim 13, wherein the registration server stores a list of identifiers associated with the token.

16. The computer-implemented system according to claim 13, wherein the stored captured multimedia data is based on user-input corresponding to the secondary application.

17. The computer-implemented system according to claim 13, wherein the stored captured multimedia data is based on metadata associated with the captured multimedia data.

18. The computer-implemented system according to claim 17, wherein the path is created from attributes associated with the secondary application or input received from a graphical user interface associated with the secondary application.

19. The computer-implemented system according to claim 13, wherein the path is created based on default values associated with the template.

* * * * *